United States Patent [19]
Takada et al.

[11] Patent Number: 5,303,241
[45] Date of Patent: Apr. 12, 1994

[54] DEMULTIPLEXING SYSTEM FOR WORD INTERLEAVED HIGHER ORDER SIGNALS IN A DIGITAL COMMUNICATION SYSTEM

[75] Inventors: Tadayuki Takada; Haruki Watanabe, both of Kawasaki, Japan

[73] Assignee: Fujitsu Limited, Japan

[21] Appl. No.: 797,296

[22] Filed: Nov. 25, 1991

[30] Foreign Application Priority Data
Nov. 27, 1990 [JP] Japan .................. 02-323704

[51] Int. Cl.$^5$ ............................................ H04J 3/06
[52] U.S. Cl. ........................... 370/100.1; 370/105.4; 375/114
[58] Field of Search ............ 370/100.1, 103, 105.1, 370/105.2, 105.4, 106; 375/114, 116; 371/42, 27

[56] References Cited

U.S. PATENT DOCUMENTS

| | | | |
|---|---|---|---|
| 4,644,536 | 2/1987 | Utsumi | 370/105.1 |
| 4,788,681 | 11/1988 | Thomas et al. | 375/114 |
| 4,984,238 | 1/1991 | Watanabe et al. | 375/114 |
| 5,014,272 | 5/1991 | Yoshida | 370/100.1 |

FOREIGN PATENT DOCUMENTS

| | | |
|---|---|---|
| 57-28449 | 2/1982 | Japan . |
| 58-195340 | 11/1983 | Japan . |
| 62-217747 | 9/1987 | Japan . |
| 2189668 | 10/1987 | United Kingdom . |

*Primary Examiner*—Douglas W. Olms
*Assistant Examiner*—Dang Ton
*Attorney, Agent, or Firm*—Greer, Burns & Crain, Ltd.

[57] ABSTRACT

In a word synchronous system for a word interleave method in a digital communication system, the word synchronous system includes a line demultiplexing unit that receives a higher order signal for demultiplexing lower order signals therefrom; a window generating unit operatively connected to the line demultiplexing unit for generating windows to demultiplex the lower order signals from the higher order signal in the line demultiplexing unit; and a plurality of sub-demultiplexing units operatively connected to the line demultiplexing unit for receiving corresponding lower order signals from the line demultiplexing unit; wherein the window generating unit receives any one of lower order signals from the line demultiplexing unit and performs the detection of frame synchronous words from said lower order signal, when the window generating unit detects any one of frame synchronous words, the window generating unit performs a bit shift operation for the window in such a way that the bits are immediately shifted to the frame synchronous word to obtain synchronization with the window.

3 Claims, 14 Drawing Sheets

DEMULTIPLEXING SYSTEM FOR WORD INTERLEAVED HIGHER ORDER SIGNALS IN A DIGITAL COMMUNICATION SYSTEM

BACKGROUND OF THE INVENTION

1. Field of the Invention

The present invention relates to a word synchronous system for a word interleave method in a digital communication.

2. Description of the Related Art

As is well known, there are two methods for interleaving in a digital communication system, i.e., a bit interleave method and a word interleave method. The former means that lower order signals are multiplexed for every bit to form a higher order signal (so-called, bit multiplex). The latter means that the lower order signals are multiplexed for every word to form a higher order signal (so-called, word multiplex). The present invention is applied to a word interleave method.

In the word interleave method, the lower order signals are multiplexed to the higher order signal in a transmitting side and the higher order signal is sent to a receiving side. In the receiving side, the higher order signal is demultiplexed to the lower order signals.

In the receiving side, it is necessary to obtain word synchronization when demultiplexing the higher order signal. The present invention relates to a word synchronous system for the word interleave method in the reception side.

SUMMARY OF THE INVENTION

The object of the present invention is to provide a word synchronous system for a word interleave method enabling high speed word synchronization.

In accordance with a first aspect of the present invention, there is provided a word synchronous system for a word interleave method in a digital communication system. The word synchronous system includes:

a line demultiplexing unit receiving a higher order signal for demultiplexing lower order signals therefrom;

a window generating unit operatively connected to the line demultiplexing unit for generating windows to demultiplex the lower order signals from the higher order signal in the line demultiplexing unit; and a plurality of sub-demultiplexing units operatively connected to the line demultiplexing unit for receiving corresponding lower order signals from the line demultiplexing unit;

wherein the window generating unit receives any one of the lower order signals from the line demultiplexing unit and performs the detection of frame synchronous words from said lower order signal, when the window generating unit detects any one of the frame synchronous words, the window generating unit performs the bit shift operation for the window in such a way that the bits are immediately shifted to the frame synchronous word to obtain synchronization with the window.

In the preferred embodiment, the window generating unit includes a plurality of frame synchronous word detection circuits receiving in common the frame synchronous word to detect the frame synchronous word; OR gate receiving synchronous signals from the frame synchronous detection circuits that output high or low level signals in accordance with the synchronous signals; a first shift timing generator receiving the synchronous signals and outputting a shift timing signal; a second shift timing generator for generating the shift timing signal; a "m" dividing circuit for obtaining word length each having "m" bits; and an "n" dividing circuit for obtaining windows, wherein the synchronous signals become low when the frame synchronous word is not detected, and become high when the frame synchronous word is detected; the output of the OR gate becomes low when the frame synchronous word is not detected, when this low level signal is input to the OR gate through the OR gate, the shift timing signal of the second shift timing generator is input to the OR gate through the edge detection circuit so that the window is shifted by one bit, further, when the window is not synchronized with the frame synchronous word but synchronized with another frame synchronous word, the detection circuit outputs the synchronous signal having a high level so that the bit shift for the window is stopped.

In accordance with a second aspect of the present invention, there is provided a word synchronous system for a word interleave method in a digital communication system, the word synchronous system includes:

a line demultiplexing unit receiving a higher order signal for demultiplexing lower order signals therefrom;

a window generating unit operatively connected to the line demultiplexing unit for generating windows to demultiplex the lower order signals from the higher order signals in the line demultiplexing unit; and a plurality of sub-demultiplexing units each operatively connected to the line demultiplexing unit for receiving corresponding lower order signals from the line demultiplexing unit and each generating a synchronous signal to the window generating unit;

wherein the window generating unit receives any one of lower order signals from the line demultiplexing unit, performs the detection of a common pattern among frame synchronous words from said lower order signal, and establishes word synchronization based on a common pattern. Following this synchronization, the window generating unit performs the bit shift operation to establish the frame synchronization based on the synchronous signal input from the sub-demultiplexing unit.

In the preferred embodiment, the window generating unit includes a frame synchronous word detection circuit receiving the frame synchronous word to detect a common pattern; an OR gate receiving synchronous signals from the sub-demultiplexing unit and outputting high or low level signals in accordance with the synchronous signals; a first shift timing generator receiving the output of the OR gate and outputting a shift timing signal; a second shift timing generator for generating the shift timing signal; a "m" dividing circuit for obtaining word length each having "m" bits; and an "n" dividing circuit for obtaining windows.

When common pattern detection circuit detects the common pattern, the window is synchronized with the lower order signal. Following this synchronization, the window is shifted in accordance with the synchronous signals from the sub-demultiplexing unit to synchronize the window with the frame.

In accordance with a third aspect of the present invention, there is provided a word synchronous system for a word interleave method in a digital communication system, the word synchronous system including:

a line demultiplexing unit receiving a higher order signal for demultiplexing lower order signals therefrom;

a window generating unit operatively connected to the line demultiplexing unit for generating windows to demultiplex the lower order signals from the higher order signal in the line demultiplexing unit;

a plurality of sub-demultiplexing units each operatively connected to the line demultiplexing unit for receiving corresponding lower order signals from the line demultiplexing unit and each generating a synchronous signal to the window generating unit; and a word synchronous detection unit operatively connected to the line demultiplexing unit and the window generating unit for receiving the higher order signals and generating a detection signal to the window generating unit;

wherein word synchronous detection is performed for the higher order signals, the detection signal at the word synchronous detection unit is input to the window generating unit, the window generating unit generates the windows synchronized with the word, and the windows are shifted by the synchronous signals from the sub-demultiplexing unit to establish frame synchronization.

DESCRIPTION OF THE PREFERRED EMBODIMENTS

Before describing the preferred embodiments, an explanation will be given of a conventional art.

Figure 1:
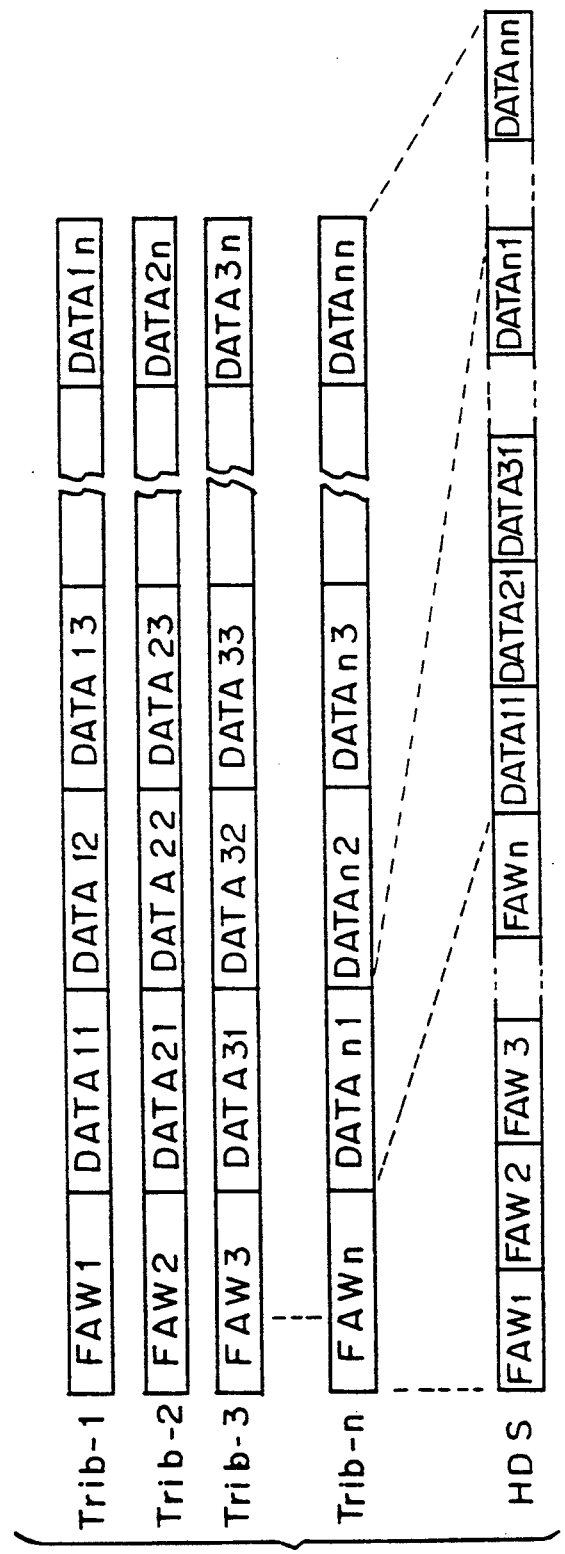
FIG. 1 is a view explaining the relationship between lower order signals and a higher order signal in a transmission side.

FIG. 1 is a view explaining the relationship between lower order signals and a higher order signal in a transmitting side in a digital communication system. In FIG. 1, "Trib-1" to "Trib-n" denote the lower order signals, and HDS denotes the higher order signal. Further, FAW-1 to FAW-n denote frame synchronous words, and DATA-11 to DATA-n3 denote data words. As shown in the drawing, each lower order signal has one frame synchronous word FAW and a plurality of data words DATA. The higher order signal HDS is obtained in such a way that, first, the frame synchronous words FAW-1 to FAW-n of the lower order signals Trib-1 to Trib-n are multiplexed to a train of the frame synchronous words FAW-1 to FAW-n of the higher order signal HDS, second, the data words DATA-11 to DATA-n1 of the lower order signals Trib-1 to Trib-n are multiplexed to the train of the data words DATA-11 to DATA-n1 of the higher order signal HDS. Similarly, the data words DATA-12 to DATA-n2 and DATA-13 to DATA-n3 of the lower order signals Trib-1 to Trib-n are multiplexed to the train of the data words of the higher order signal HDS, respectively. As a result, the higher order signal HDS is constituted by the frame synchronous words FAW-1 to FAW-n and the data words DATA-11 to DATA-nn.

Figure 2:
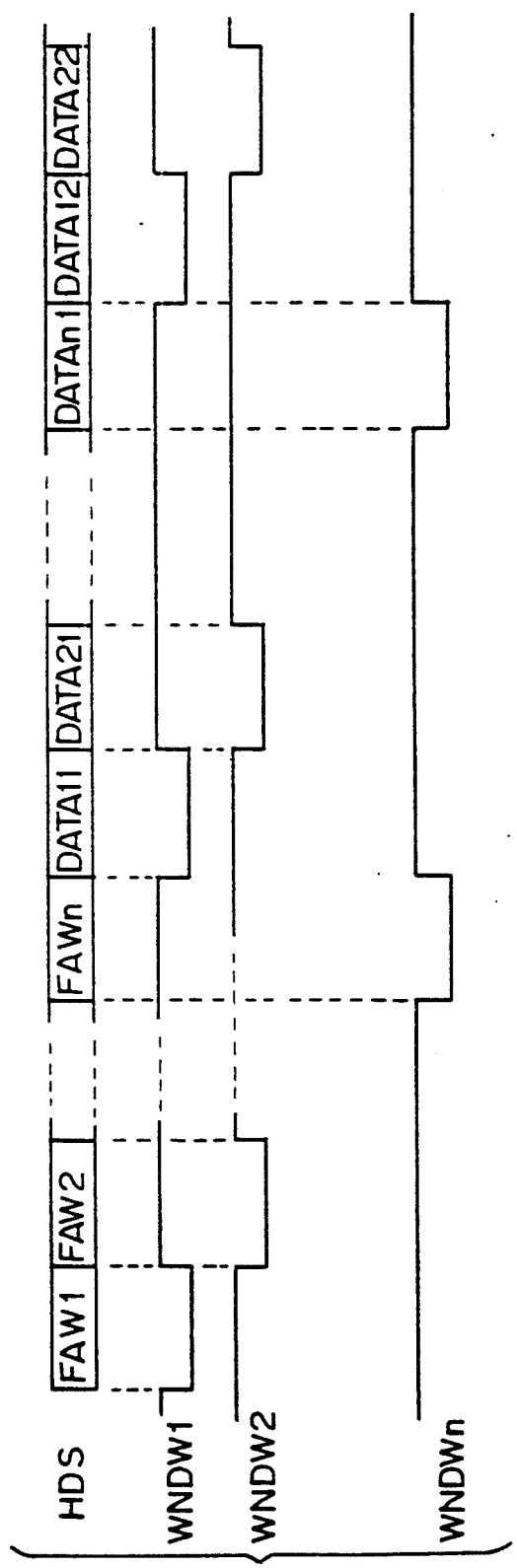
FIG. 2 is a view explaining demultiplex in a reception side.

FIG. 2 is a view explaining demultiplex in a reception side. In FIG. 2, WNDW-1 to WNDW-n denote windows for demultiplexing the higher order signal HDS into the data words DATA-11 to DATA-nn of the lower order signals Trib-1 to Trib-n. The window WNDW has the same word width as the word length of the data word DATA. The higher order signal HDS is demultiplexed (i.e., separated) into the data words DATA by the window WNDW. That is, the window WNDW-1 is used for obtaining the data words DATA-11, DATA-12, ..., DATA-1n of the lower order signal Trib-1. Similarly, the window WNDW-2 is used for obtaining the data words DATA-21, DATA-22, ..., DATA-2n of the lower order signal Trib-2, and the window WNDW-n is used for obtaining the data words DATA-n1, DATA-n2, ..., DATA-nn of the lower order signal Trib-2 (see, FIG. 1). The frame synchronous words FAW-1 to FAW-2 are also separated by the window WNDW in each lower order signal Trib-1 to Trib-n.

Figure 3:
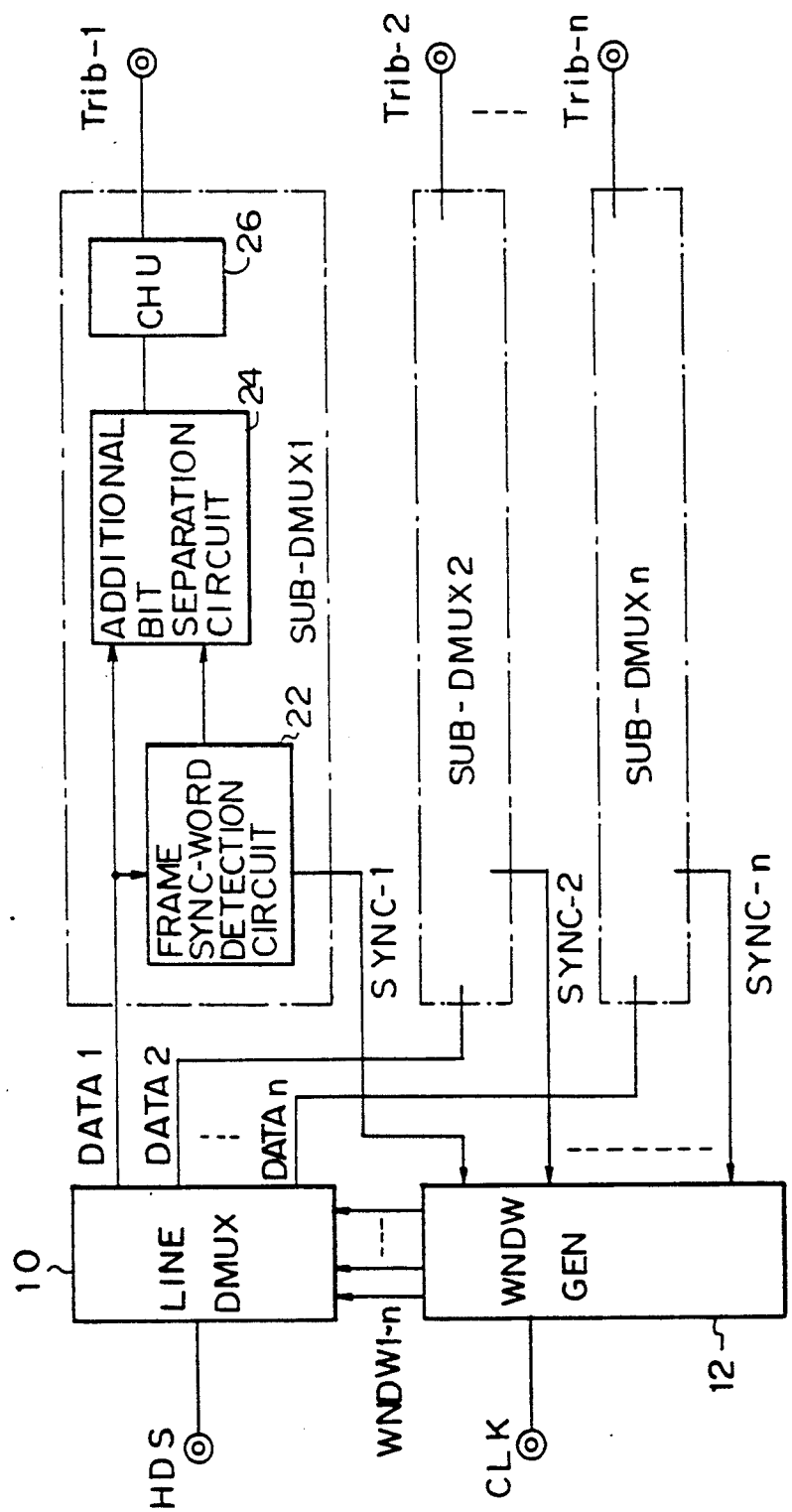
FIG. 3 is a schematic block diagram of a conventional frame synchronous system.

FIG. 3 is a schematic block diagram of a conventional frame synchronous system in the reception side. In FIG. 3, reference number 10 denotes a line demultiplexer (LINE-DMUX), 12 denotes a window generator (WNDW-GEN), and SUB-DMUX1 to SUB-DMUXn denote sub-demultiplexers. The sub-demultiplexer SUB-DMUX has a frame synchronous word detection circuit 22, an additional bit separation circuit 24, and a channel unit 26. All sub-demultiplexers SUB-DMUX2 to SUB-DMUXn have the same structure as the sub-demultiplexer SUB-DMUX1.

The line demultiplexer 10 receives the higher order signals HDS and separates them into the data words DATA-1 to DATA-n of the lower order signals in accordance with the corresponding window WNDW from the window generator 12. The data words DATA-1 to DATA-n correspond to the lower order signals Trib-1 to Trib-n shown in FIG. 1. For example, the data word DATA-1 corresponds to the lower order signal Trib-1. The window generator 12 receives clock signals CLK and counts them to generate the windows WNDW-1 to WNDW-n. The clock signal CLK corresponds to bit clocks generated by a PLL circuit (not shown) based on the higher order signal HDS.

For example, the data word DATA-1 is input to the sub-demultiplexer SUB-DMUX1, and the data word DATA-2 is input to the sub-demultiplexer SUB-DMUX2. Similarly, the data word DATA-n is input to the sub-demultiplexer SUB-DMUXn. The frame synchronous word detection circuit 22 detects the frame synchronous word FAW of the data word DATA and outputs a synchronous signal SYNC indicating a result of the detection (high or low level) to the window generator 12. For example, in the sub-demultiplexer SUB-DMUX1, the frame synchronous word detection circuit 22 detects the frame synchronous word FAW-1 of the data word DATA-1 and outputs the synchronous signal SYNC-1 to the window generator 12. Similarly, in the sub-demultiplexer SUB-DMUXn, the frame synchronous word detection circuit 22 detects the frame synchronous word FAW-n of the data word DATA-n and outputs the synchronous signal SYNC-n to the window generator 12.

The additional bit separation circuit 24 is provided for separating additional bits, for example, frame synchronous words and parity bits from the data word DATA. Further, the channel unit 26 is provided for smoothing the data word DATA to send to the next stage. The detailed explanations of these units 24 and 26 are omitted in this specification because said circuits do not relate directly to the problems of the conventional art. The lower order signals Trib can be obtained from the sub-demultiplexer SUB-DMUX. These lower order signals Trib-1 to Trib-n at the output of the sub-demultiplexer do not contain the frame synchronous word FAW because the data word DATA is already synchronized with the window WNDW.

Figure 4:
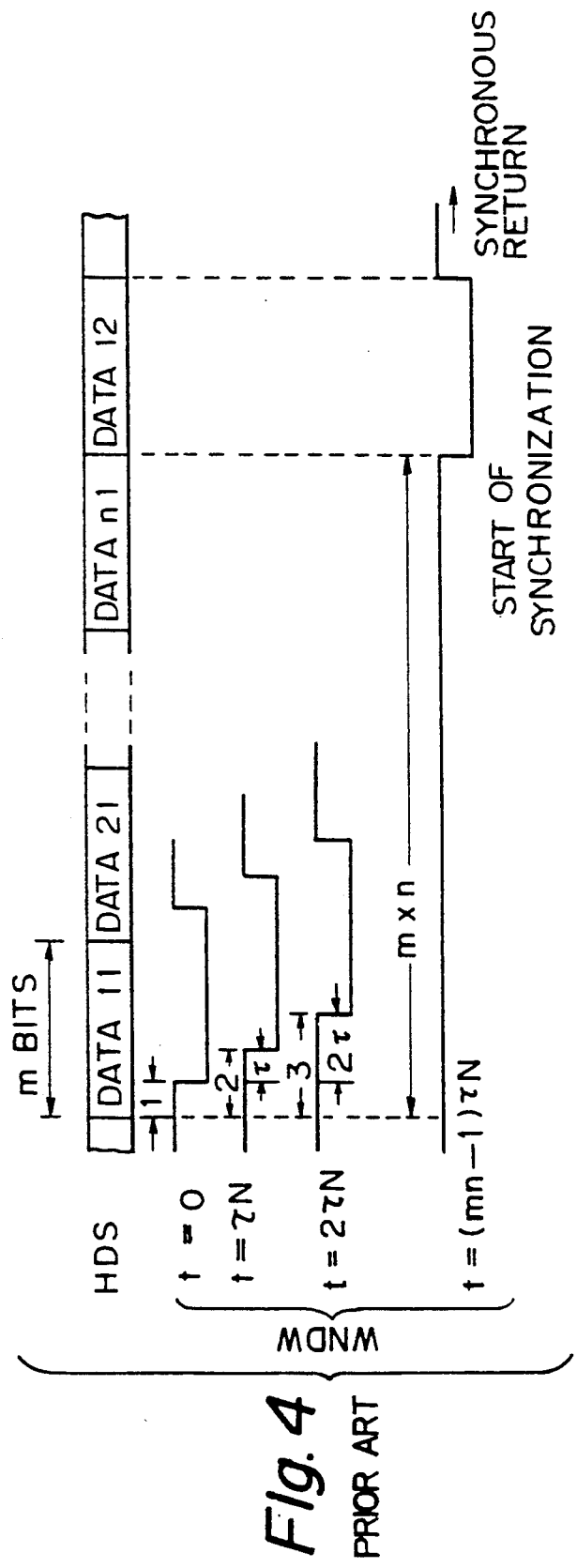
FIG. 4 is a timing chart explaining windows generated by the window generator shown in FIG. 3.

FIG. 4 is a timing chart for generating the window from the window generator 12. In FIG. 4, "m" is one word length (i.e., one data word DATA has "m" bits). This word length is also equal to the window width. Further, "n" is the number of word multiplexes, "N" is the number of stages (repetition) for establishing synchronous protection. Usually, N is three times. Still further, "$\tau$" is a frame period of the lower order signals. That is, the "$\tau$" is equal to a waiting time for detecting the frame synchronous word FAW until the synchronous protection is established in the frame synchronous word detection circuit 22.

In the first stage (N=1), when the time "t" is "0" (t=0), the window is shifted by one bit. After the time t=$\tau$, the window is further shifted by one bit. Still further, after the time t=2$\tau$, the window is further shifted by one bit. Accordingly, after the time t=(mn−1)$\tau$, the first synchronous stage is started so that the first synchronous protection is obtained in the data word DATA-12. Similarly, in the second and third stages (N=2, 3), the window is shifted in the same way as that of the first stage so that it is possible to establish synchronous protection and obtain a synchronous return.

In the above operation, first, the window WNDW is not synchronized with the synchronous signal SYNC. That is, in FIG. 3, the frame synchronous word detection circuit 22 outputs a low level synchronous signal SYNC (1) to the window generator 12. In this case, the window generator 12 performs an OR operation among synchronous signals SYNC-1 to SYNC-n. When the result of the OR operation is low (i.e., this interval is equal to the waiting time $\tau$), the window is shifted by one bit as explained above.

When the frame synchronous word FAW is synchronized with the window WNDW, the synchronous signal SYNC becomes high (H). When the window generator 12 receives a high level synchronous signal SYNC, the shift operation by the window generator 12 is stopped after N repetition, for example, three times repetition (N=3).

Figure 5:
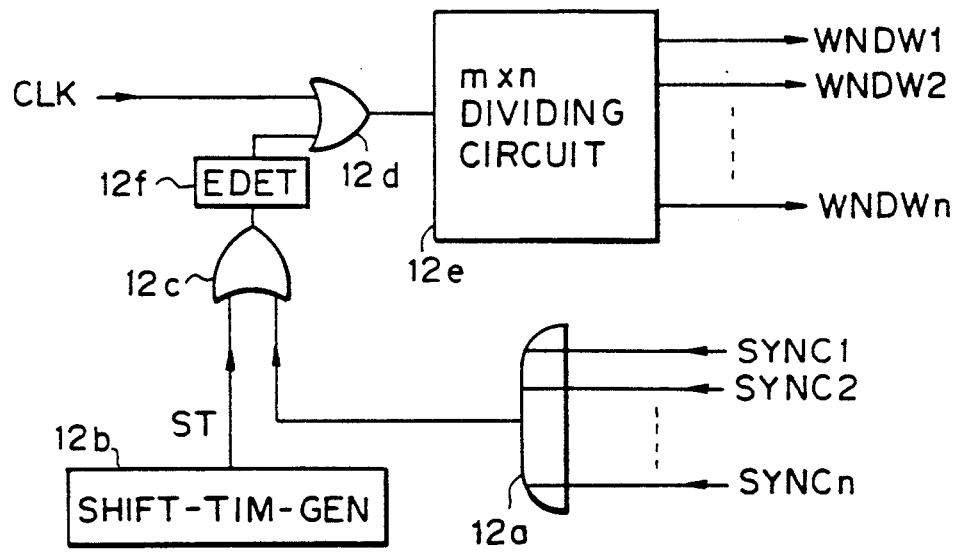
FIG. 5 is a schematic block diagram of the window generator shown in FIG. 3.

FIG. 5 is a schematic block diagram of the window generator shown in FIG. 3. In FIG. 5, 12a denotes an OR gate having multi-inputs, 12b denotes a shift timing generator, 12c and 12d denote OR gates, 12e denotes a "m×n" dividing circuit, and 12f denotes an edge detector (EDET). The OR gate 12a receives the synchronous signals SYNC-1 to SYNC-n, and outputs the high level signal when any one of synchronous signals SYNC is high. This high level signal is input to the OR gate 12c. The shift timing generator 12b generates a shift timing signal ST having "$\tau$N" of one period to shift the window for every one bit.

When the output of the OR gate 12a is high, the OR gate 12c outputs only a high level signal regardless of the level of the shift timing signal ST. Accordingly, the edge detection circuit 12f detects the edge of the high level signal from the output of the OR gate, and outputs the high level signal to the OR gate 12d. The clock signal CLK obtained by the higher order signal HDS is also input to the OR gate 12d. Accordingly, when the high level signal is input to the OR gate 12d, the OR gate 12d outputs only the high level signal regardless of the level of the clock signal CLK so that it is possible to stop the shift operation of the window. Further, the m×n dividing circuit 12e counts the number of clocks CLK and outputs windows WNDW-1 to WNDW-n.

When the output of the OR gate 12a is low, the OR gate 12c alternately outputs a high or low level in accordance with the shift timing signal ST. The edge of the shift timing signal ST is always detected by the edge detector 12f. In this case, since the shift timing signal ST is generated by the shift timing generator 12b based on the period "$\tau$N", the edge detection circuit 12e generates the edge signal in the timing of the "$\tau$N". Accordingly, the clock signal CLK is inhibited by the edge detection signal in the timing of the "$\tau$N" so that the window can be shifted by one bit.

In the above conventional art shown in FIG. 3, the frame synchronous word detection circuit 22 is provided for the lower order signals. Further, the window WNDW is sequentially shifted by one bit until the window WNDW is synchronized with the data word DATA. Accordingly, as explained in FIG. 4, much waiting time "$\tau$" is necessary to obtain synchronization in the frame synchronous word detection circuit 22. As the worst case, the time (mn−1)$\tau$N is necessary as the waiting time in the frame synchronous word detection circuit 22.

Figure 6:
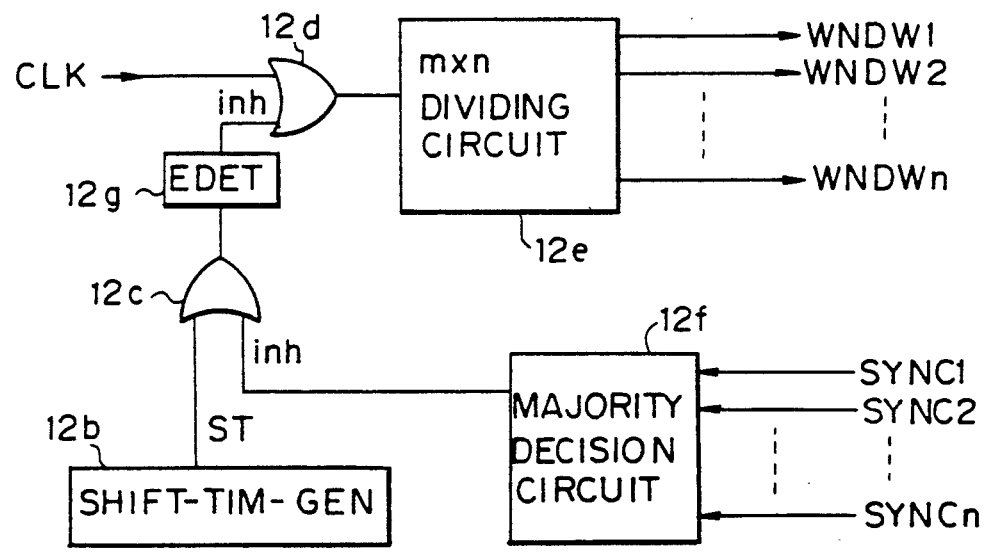
FIG. 6 is a basic block diagram of another example of a synchronous system in a conventional art.

FIG. 6 is another example of a synchronous system for a word interleave method. This structure is used to explain the present invention. In FIG. 6, reference number 12f denotes a majority decision circuit. The majority decision circuit 12f performs the decision by majority among the synchronous signals SYNC-1 to SYNC-n, and result of the majority is output to the OR gate 12c.

In this case, synchronous protection is not necessary for the frame synchronous word detection circuit 22 (i.e., number of repetition N=1). That is, when the frame synchronous word FAW is detected, the synchronous signal SYNC is set at a high level. When the number of high level synchronous signals SYNC is more than that of low level signals, the majority decision circuit 12f outputs an inhibit signal "inh" to the OR gate 12c so that the bit shift operation in the window WNDW is stopped in accordance with the inhibit signal "inh" as explained in FIG. 5. According to this structure, it is possible to quickly obtain synchronous protection compared with the conventional art shown in FIG. 3, because synchronous protection is not necessary.

The present invention is explained in detail hereinafter. The same reference numbers as used in FIGS. 1 to 6 are attached to similar components in the following drawings.

Figure 7:
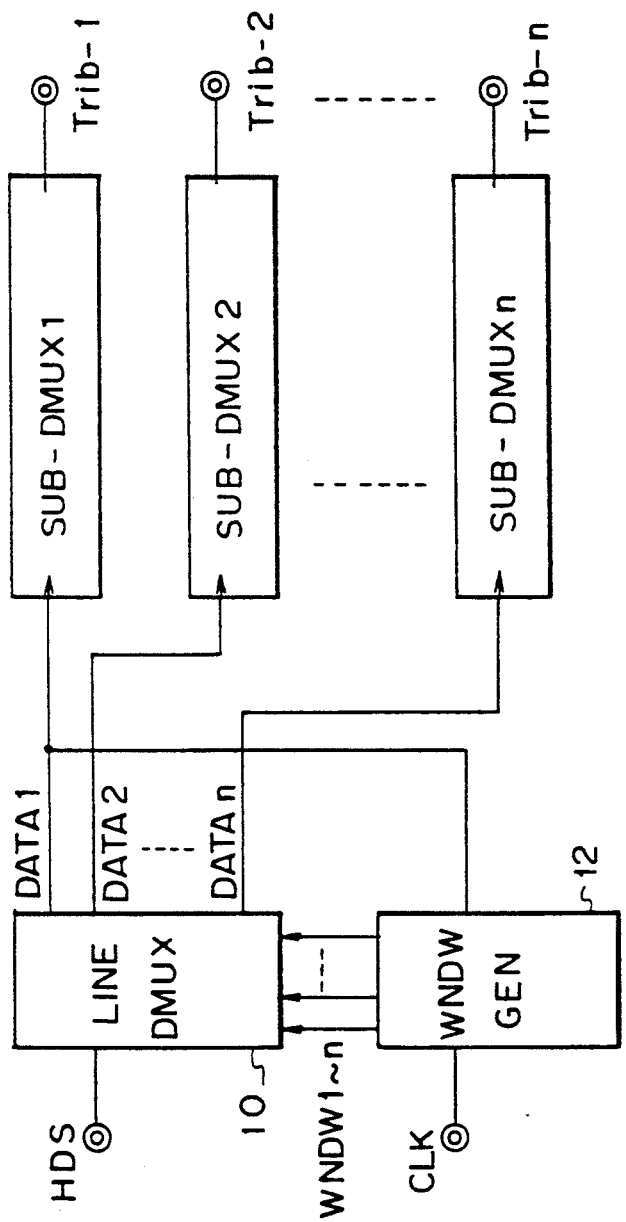
FIG. 7 is a basic block diagram of a word synchronous system for a word interleave method according to the first aspect of the present invention.

FIG. 7 is a basic block diagram of a word synchronous system for a word interleave method according to the first aspect of the present invention. As shown in the drawing, any one of data words from the line demultiplexer 10, for example, the data word DATA-1 is input parallel to the window generator 12 and the sub-demultiplexer SUB-DMUX1. When the window generator 12 detects any one of frame synchronous words, for example, the frame synchronous word FAW-2, the window generator 12 performs a bit shift operation to obtain synchronous protection in such a way that the bits are immediately shifted to the frame synchronous word FAW-2 in the window generator 12.

In the first aspect, it is possible to quickly establish synchronous protection compared with the conventional art. That is, one of the frame synchronous words is detected from the lower order signal, and the bits are immediately shifted until the detected frame synchronous word (for example, FAW-2) is synchronized with said lower order signal (for example, DATA-2).

Figure 8:
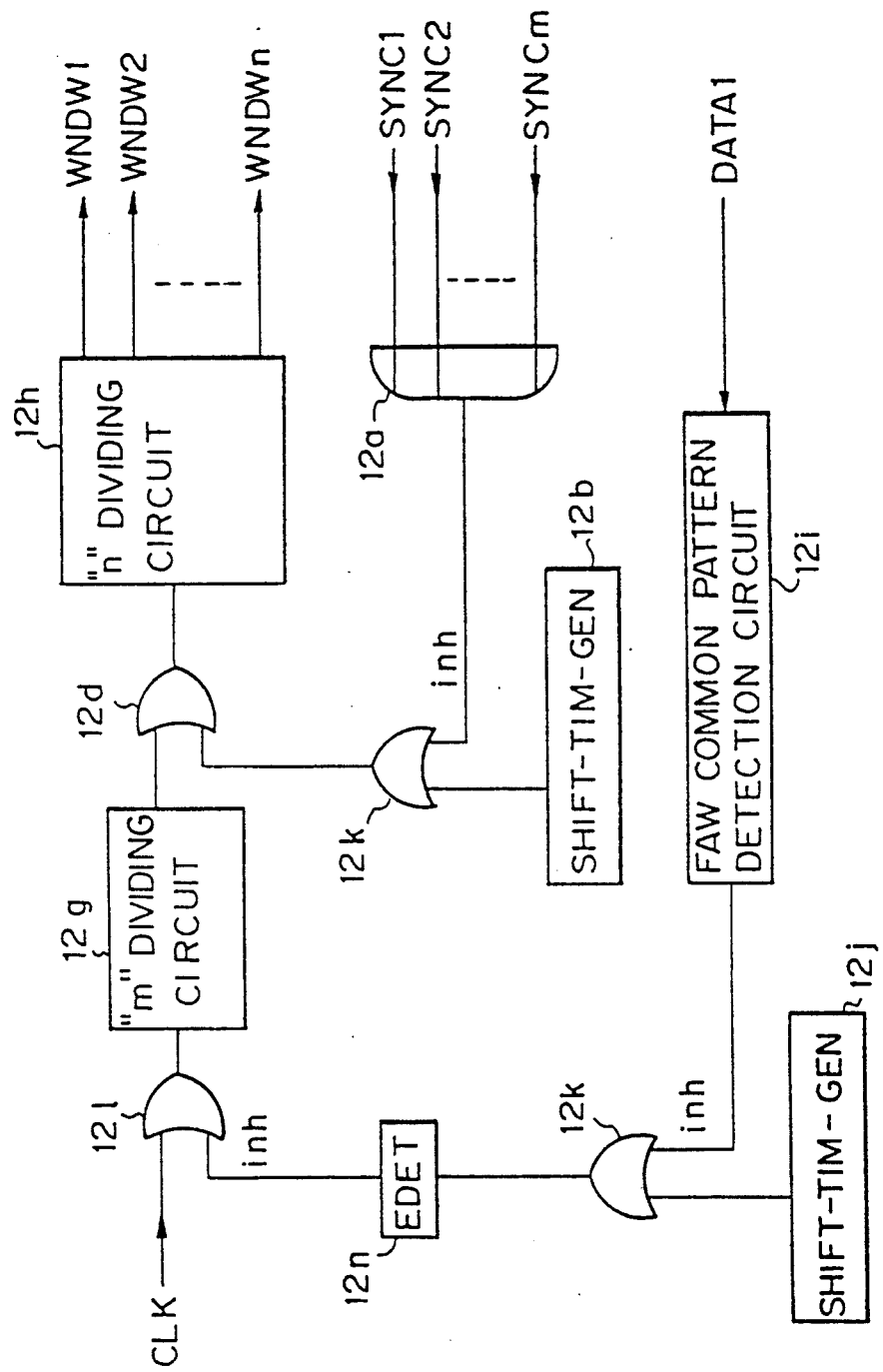
FIG. 8 is a detailed block diagram of a window generator of a word synchronous system according to the second aspect of the present invention.

FIG. 8 is a detailed block diagram of a window generator of a word synchronous system according to the second aspect of the present invention. In FIG. 8, reference number 12g denotes a "m" dividing circuit, 12h denotes a "n" dividing circuit, and 12i denotes a FAW common pattern detection circuit. In the second aspect of the present invention, only one of the FAW common pattern detection circuits 12i is provided in the window generator and the common pattern detection circuit 12i detects the common pattern among the frame synchronous words FAW-1 to FAW-n. When the common pattern is detected, the window WNDW is synchronized with the data word DATA in the common pattern detection circuit 12i, the OR gate 12k, the OR gate 12l, and "m" dividing circuit 12g. Following this synchronization, the window WNDW is shifted in accordance with the synchronous signals SYNC-1 to SYNC-n to synchronize the window with the frame in the OR gates 12a, 12k, and 12d.

In the second aspect, it is possible to quickly establish synchronous protection compared with the conventional art because the common pattern is detected and the window is synchronized with the data word.

Figure 9:
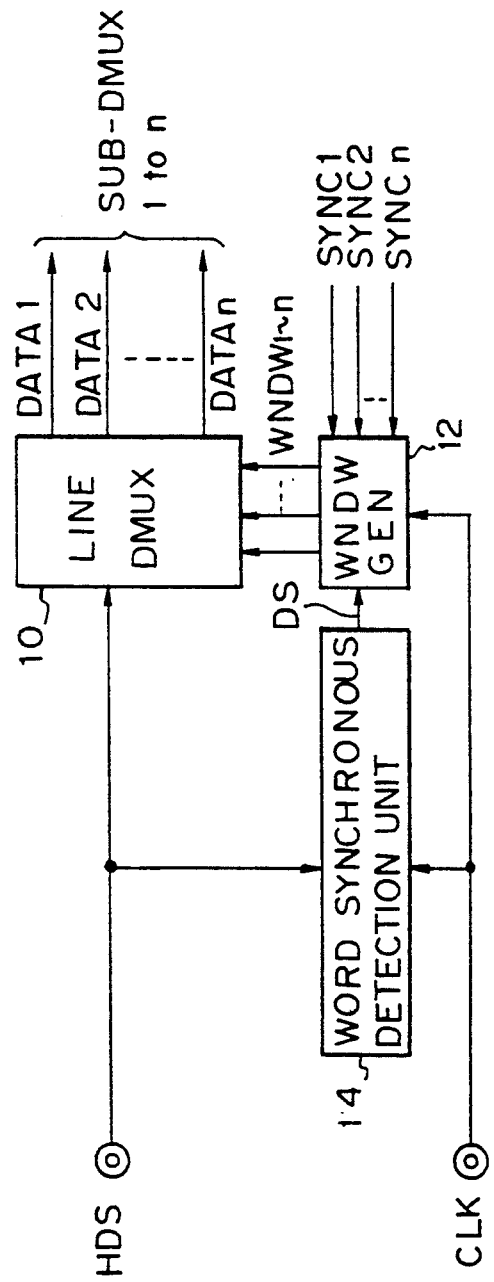
FIG. 9 is a basic block diagram of a word synchronous system for a word interleave method according to the third aspect of the present invention.

FIG. 9 is a basic block diagram of a word synchronous system for a word interleave method according to the third aspect of the present invention. In FIG. 9, reference number 14 denotes a word synchronous detection unit that detects the data word DATA in the higher order signal HDS. The feature of the third aspect of the present invention lies in that the word synchronous detection is performed for the higher order signal HDS. The detection signal DS at the word synchronous detection circuit 14 is input to the window generator 12 to control the bit shift and to generate the window WNDW-1 to WNDW-n synchronized with the data word. After this synchronization, the frame synchronous word FAW is detected from the lower order signals extracted by this window. Further, the bits are shifted in accordance with the synchronous signals SYNC-1 to SYNC-n to synchronize the window with the frame.

As explained above, the word synchronous detection unit 14 is provided for the side of the higher order signal HDS. After word synchronization is established in the side of the higher order signal HDS, the frame synchronization is established in the side of the lower order signals Trib. The higher order signal HDS is input to the word synchronous detection unit 14. The window WNDW is shifted by one bit in response to the output of the word synchronous detection unit 14 so that word synchronization is established.

In the third aspect, it is possible to quickly establish synchronous protection compared with the conventional art. That is, the word detection is performed from the higher order signal HDS, the bits are shifted in response to the detected signals, and the window is synchronized with the word. After this synchronization, the bits are shifted by the synchronous signals SYNC-1 to SYNC-n so that the windows are synchronized with the frame.

Figure 10:
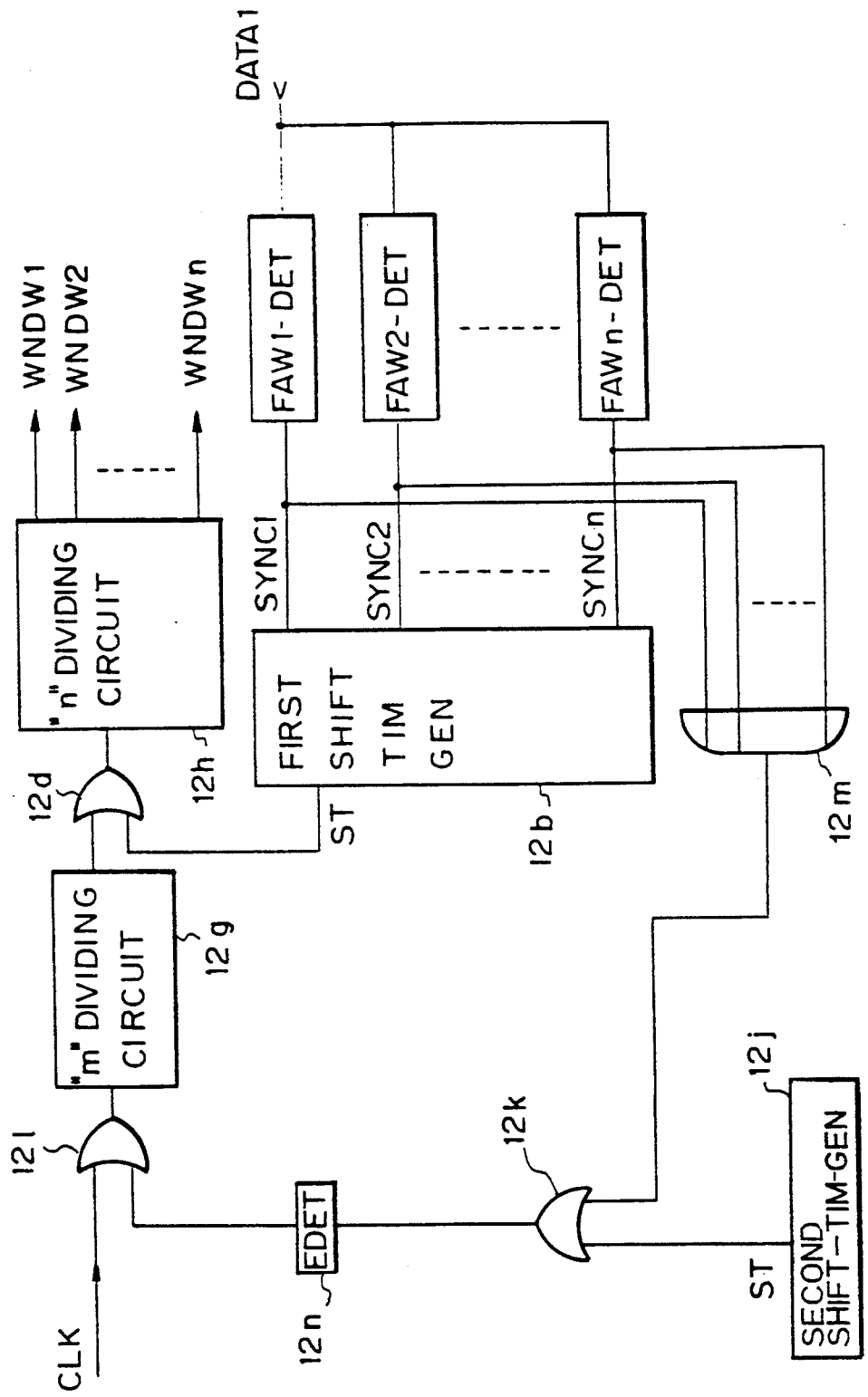
FIG. 10 is a detailed block diagram of the first aspect of the present invention shown in FIG. 7.

FIG. 10 is a detailed block diagram of the window generator according to the first aspect of the present invention shown in FIG. 7. In FIG. 10, FAW1-DET to FAWn-DET denote frame synchronous word detection circuits that receive the data word, for example, the data word DATA-1 (i.e., lower order signal Trib-1) and detect the frame synchronous words FAW-1 to FAW-n. The detected synchronous signals are input to the first shift timing generator 12b and the OR gate 12m. In this case, the synchronous signals SYNC-1 to SYNC-n become low (L level) when the frame synchronous word FAW is not detected, and become high (H level) when the frame synchronous word FAW is detected. Accordingly, the output of the OR gate 12m becomes low when the frame synchronous word FAW is not detected. When this low level signal is input to the OR gate 12l through the OR gate 12k, the shift timing signal ST of the second shift timing generator 12j is input to the OR gate 12l through the edge detection circuit 12n. Accordingly, the window is shifted by one bit, as explained above.

In the circuit shown in FIG. 10, when the window WNDW-1 is not synchronized with the frame synchronous word FAW-1 but synchronized with another frame synchronous word FAW, for example, FAW-2, the detection circuit FAW2-DET outputs the high level synchronous signal SYNC-2 so that one bit shift for the window is stopped.

Figure 11:
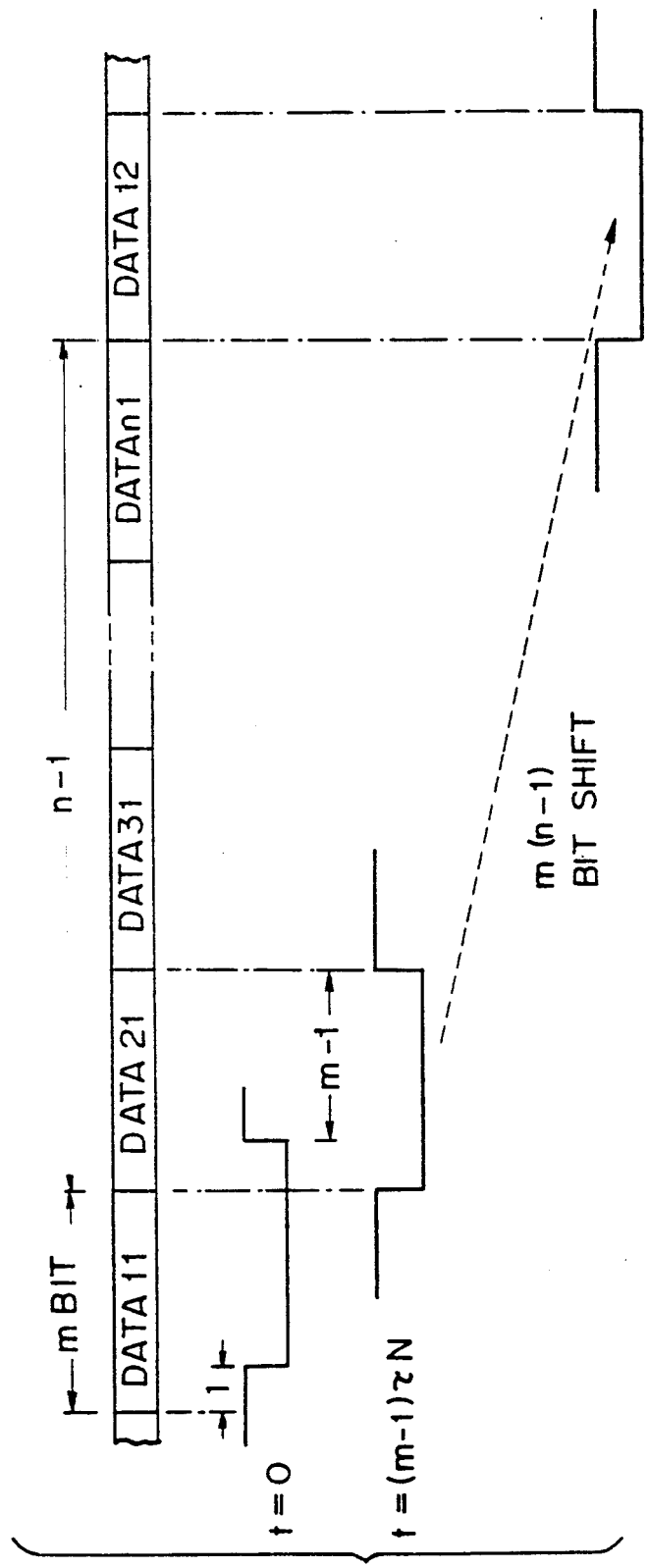
FIG. 11 is a timing chart explaining the operation of the circuit shown in FIG. 10.

FIG. 11 is a timing chart for explaining the operation of the circuit shown in FIG. 10. In FIG. 11, 35 after the window WNDW-1 is shifted by (m−1) bits, it is synchronized with the frame synchronous word FAW-2 (i.e., data word DATA-12). In this case, the shift timing generator (SHIFT-TIM-GEN) 12b of FIG. 10 outputs the control signal for shifting by the bit length of m(n−1), the OR gate 12d operates so as to inhibit the passing of (n−1) clocks corresponding to each word in accordance with the output of "m" dividing circuit 12g (i.e., "m" divided clock CLK). Accordingly, the window WNDW-1 is shifted by (n−1) bits and synchronized with the frame synchronous word FAW-1 so that it is possible to establish the synchronous return.

According to the first aspect of the present invention, the time for synchronous return becomes $(m-1)\tau N$, as the worst case. As is obvious from FIG. 4, the time for synchronous return becomes $(mn-1)\tau N$ in the conventional art. Accordingly, the time for the synchronous return can be reduced to approximately $1/n$.

Figure 12:
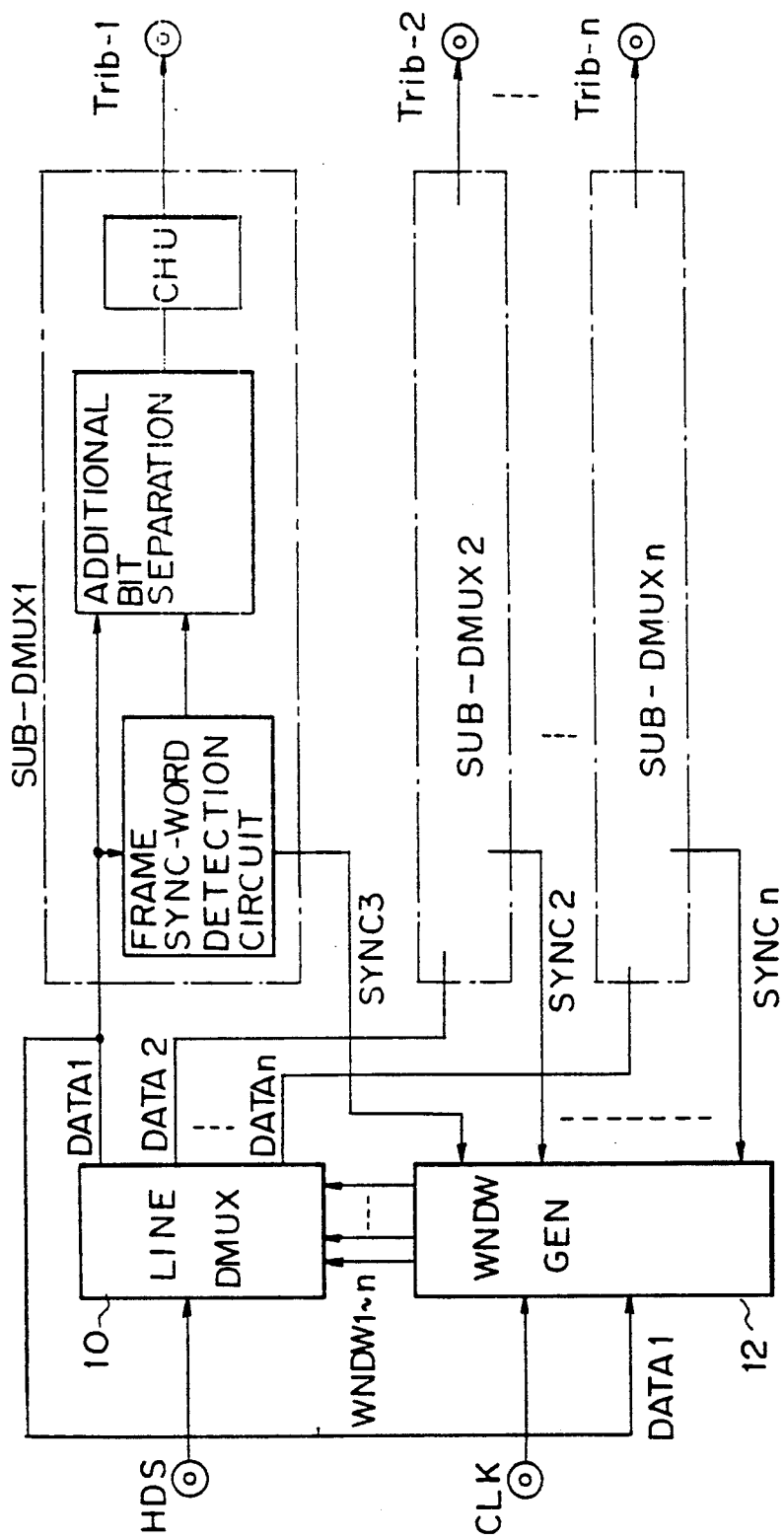
FIG. 12 is a basic block diagram of the second aspect of the present invention shown in FIG. 8.

FIG. 12 is a schematic block diagram of the second aspect of the present invention shown in FIG. 8. As shown in the drawing, the data word DATA-1 is input to the window generator 12 (i.e., to the FAW common pattern detection circuit 12i in FIG. 8). In the second aspect, the common pattern among the frame synchronous words FAW is detected by the FAW common pattern detection circuit 12i. When the common pattern is detected, the bit shift is inhibited by the gates 12k, 12l, so that word synchronization is established. Further, the window synchronized with the word is generated by the "m" dividing circuit 12g to perform the demultiplex. Then, based on an alarm indicating frame synchronous error in the lower order signals, the word shift operation is performed by the OR gates 12a, 12k and 12d so that the timing of the demultiplex is controlled to obtain word synchronization.

Further, a common pattern is detected from the frame synchronous words FAW-1 to FAW-n to obtain word synchronization. After detection, until the alarm of the synchronous error is diffused in the sub-demultiplexer SUB-DMUX, the "m" divided clock is inhibited bit by bit in the predetermined period.

Accordingly, the time for the synchronous return becomes $(m+n-2)\tau N$, as the worst case. As shown in FIG. 4, since the time necessary for the synchronous return is given by $(mn-1)\tau N$ in the conventional art, it is possible to reduce the time for the synchronous return in the second aspect of the present invention. Further, it is possible to reduce the number of the FAW common pattern detection circuits 12i.

The frame synchronous word FAW is given by, for example, "00", "01", "11" when there are four lower order signals in a common pattern and a different pattern in each lower order signal.

Figure 13:
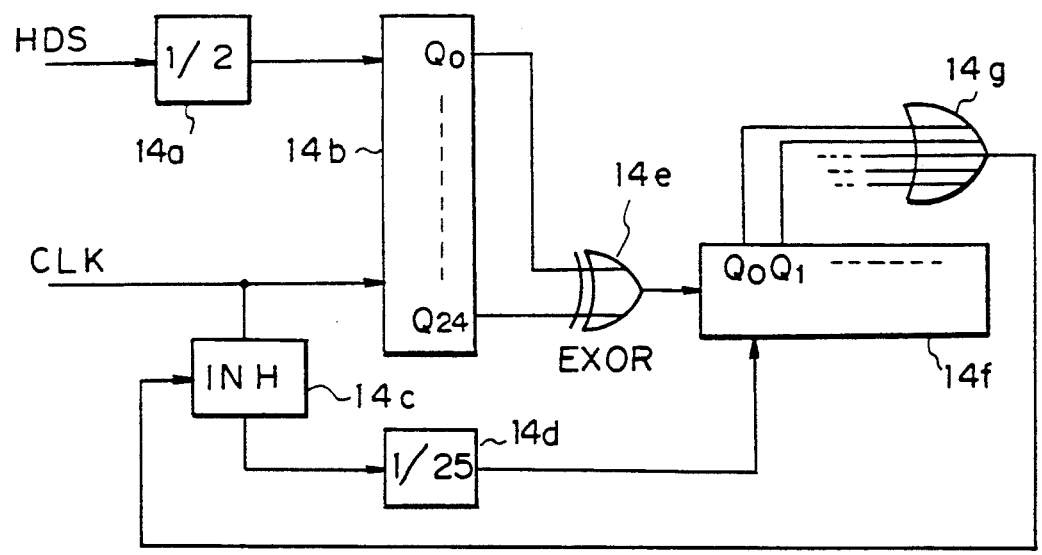
FIG. 13 is a detailed block diagram of the third aspect of the present invention shown in FIG. 9.
Figure 14:
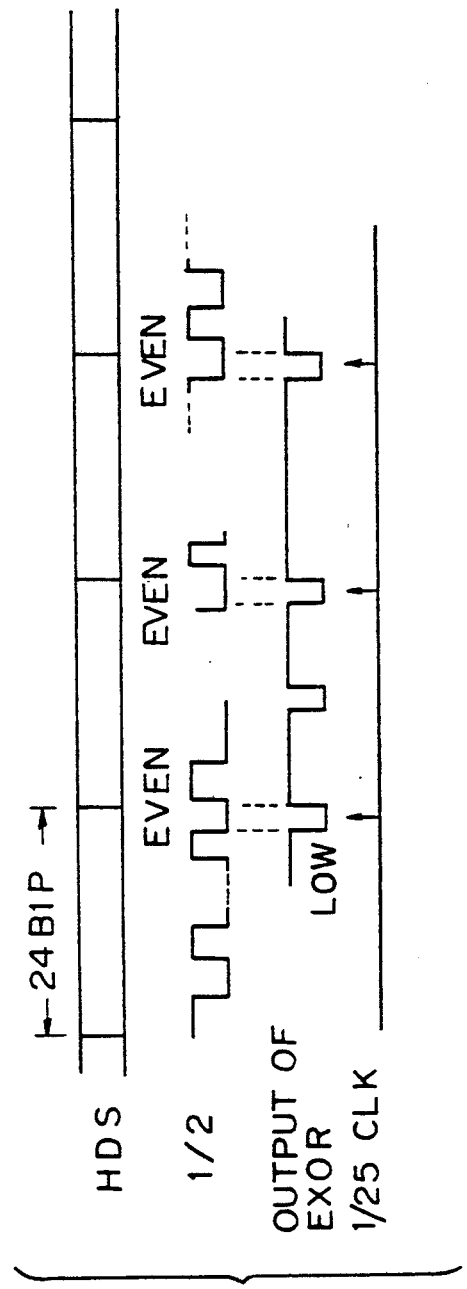
FIG. 14 is a signal timing chart in the circuit shown in FIG. 13.

FIG. 13 is a detailed block diagram of the third aspect of the present invention shown in FIG. 9, and FIG. 14 is a signal timing chart in the circuit shown in FIG. 13. In FIG. 13, reference number 14a denotes a "½" dividing circuit, 14b denotes a twenty-five bits shift register, 14c denotes an inhibit gate, 14d denotes a "1/25" dividing circuit, 14e denotes an exclusive OR gate, 14f denotes a register for synchronous protection, and 14g denotes an OR gate. In this case, twenty-five bits are constituted by twenty-four bits plus one parity bit.

As shown in FIG. 14, according to a code rule of "24 bit plus one parity bit" (i.e., code rule of 24 B-1-P), since the number of "1" of each parity block is an even number, when the exclusive OR operation is performed between the higher order signal HDS and the data bit obtained by a ½ dividing operation from the higher order signal and shifted by 25 bits, the input signals coincide with each other (H and H, or L and L) for every 25 bits so that the exclusive OR gate 14e outputs a low level. As another case, in some kinds of data patterns, since the output of the exclusive OR gate becomes low, it is necessary to perform synchronous protection. This synchronous protection is performed by the shift register 14f and the OR gate 14g. The output of the ½ dividing circuit 14a is sent to the 25 bits shift register 14b in response to the clock signal CLK of the higher order signal HDS. Further, the output of the 1/25 dividing circuit 14d is sent to the synchronous protection register 14f.

When word synchronization is established, the output of the exclusive OR gate 14e becomes low for every 25 bits and this low level is input to the register 14f. Accordingly, the outputs $Q_0, Q_1, \ldots$, of the register 14f becomes low, and the output of the OR gate 14g become low. This low level from the OR gate 14g is input to the inhibit gate 14c so that the inhibit gate 14c does not inhibit the clock CLK.

When word synchronization is not established, the output of the exclusive OR gate 14e becomes low or high for every 25 bits. Accordingly, the output of the OR gate 14g changes between a low and high level. Since this low or high level is input to the inhibit gate 14c, the inhibit gate 14c inhibits one clock of the clock signal CLK at every 25 bits so that it is possible to shift the window by one bit.

What is claimed is:

1. A system for demultiplexing a higher order signal which is multiplexed by a word interleave method in a digital communication system, said demultiplexing system comprising:

line demultiplexing means receiving a higher order signal for demultiplexing lower order signals therefrom;

window generating means operatively connected to the line demultiplexing means for generating widows to demultiplex the lower order signals from the higher order signal in the line demultiplexing means;

a plurality of sub-demultiplexing means each operatively connected to the line demultiplexing means for receiving corresponding lower order signals from the line demultiplexing means and each generating a synchronous signal to the widow generating means; and word synchronous detection means operatively connected to the line demultiplexing means and the window generating means for receiving the higher order signal and generating a detection signal to the window generating means;

wherein the work synchronous detection is performed for the higher order signal, the detected signal at the word synchronous detection means is input to the window generating means, the window generating means generates the windows synchronized with the word, and the windows are shifted by the synchronous signals from the sub-demultiplexing means to establish frame synchronization.

2. A system for demultiplexing a higher order signal which is multiplexed by a word interleave method in a digital communication system, the demultiplexing system comprising:

line demultiplexing means receiving the higher order signal for demultiplexing lower order signals therefrom, each lower order signal having a frame synchronous word;

window generating means operatively connected to the line demultiplexing means for generating widows to demultiplex the lower order signals from the higher order signal in the line demultiplexing means;

the window generating means including a plurality of frame synchronous word detection circuits receiving in common the frame synchronous words to detect the particular frame synchronous word; a first OR gate receiving a plurality of synchronous signals from the frame synchronous detection circuits and outputting high or low level signals in accordance with the synchronous signals; a first shift timing generator receiving the synchronous signals and outputting a first shift timing signal; a second shift timing generator for generating a second shift timing signal; and "m" dividing circuit for defining work lengths having each "m" bits; and an "n" dividing circuit for defining the windows, and a plurality of sub-demultiplexing means operatively connected to the line demultiplexing means for receiving corresponding lower order signals from the line demultiplexing means;

wherein the window generating means receives a selected one of the lower order signals from the line demultiplexing means and performs the detection of frame synchronous words from said selected lower order signal, and when the window generating means detects a particular one of the frame synchronous words, the window generating means performs a shift operation for the window in such a way that the window is immediately shifted to the particular frame synchronous word to establish synchronization with the windows which corresponds with the particular frame synchronous word.

3. A system for demultiplexing a higher order signal which is multiplexed by a word interleave method in a digital communication system, the demultiplexing system comprising:

line demultiplexing means receiving a higher order signal for demultiplexing lower order signals therefrom, the lower order signal each having a frame synchronous word;

window generating means operatively connected to the line demultiplexing means for generating widows to demultiplex the lower order signals from the higher order signal in the line demultiplexing means;

the window generating means including a frame synchronous word common pattern detection circuit receiving the frame synchronous word to detect the common pattern; a first OR gate receiving synchronous signals from the sub-demultiplexing means and outputting high or lower level signals in accordance with the synchronous signals; a first shift timing generator outputting a first shift timing signal which is another input to the first OR gate; a second shift timing generator for generating a second shift timing signal; a second OR gate for receiving the output of the frame synchronous word common pattern detection circuit and the output of the second shift timing generator, and "m" dividing circuit responsive to the output of the second OR gate for defining word lengths having "m" bits; and an "n" dividing circuit responsive to the output of the first OR gate and the "m" dividing circuit for defining windows, and a plurality of sub-demultiplexing means each operatively connected to the line demultiplexing means for receiving corresponding lower order signals from the line demultiplexing means and each generating a synchronous signal to the window generating means;

wherein the window generating means receives a selected one of the lower order signals from the line demultiplexing means, performs the detection of a common pattern among frame synchronous words in said lower order signal, and established word synchronization based on a common pattern, and following synchronization, the window generating means performs a bit shift operation to establish frame synchronization based on the synchronous signal input from the sub-demultiplexing means.

* * * * *

UNITED STATES PATENT AND TRADEMARK OFFICE
CERTIFICATE OF CORRECTION

PATENT NO. : 5,303,241
DATED : April 12, 1994
INVENTOR(S) : Takada et al.

It is certified that error appears in the above-indentified patent and that said Letters Patent is hereby corrected as shown below:

Column 8, line 50, delete "35".

Column 10, line 1, delete "becomes", and insert --become--.

Column 10, lines 1-2, delete "become" and insert --becomes--.

Column 10, line 30, delete "widow" and insert --window--.

Column 10, line 37, delete "work" and insert --word--.

Column 10, lines 55-56, delete "widows" and insert --windows--.

Column 11, line 3, delete "work" and insert --word--.

UNITED STATES PATENT AND TRADEMARK OFFICE
CERTIFICATE OF CORRECTION

PATENT NO. : 5,303,241
DATED : April 12, 1994
INVENTOR(S) : Takada et al.

It is certified that error appears in the above-indentified patent and that said Letters Patent is hereby corrected as shown below:

Column 11, line 19, delete "windows" and insert --window--.

Column 11, line 28, delete "signal" and insert --signals--.

Column 11, lines 31-32, delete "widows" and insert --windows--.

Column 12, line 4, delete "lower" and insert --low--.

Column 12, line 12, delete "and" and insert --an--.

Column 12, line 14, after "lengths" insert --each--.

Column 12, line 29, delete "established" and insert --establishes--.

Signed and Sealed this

Ninth Day of May, 1995

Attest:

BRUCE LEHMAN

*Attesting Officer*     *Commissioner of Patents and Trademarks*